(12) United States Patent
Syu et al.

(10) Patent No.: US 11,954,121 B2
(45) Date of Patent: Apr. 9, 2024

(54) SELECTION APPARATUS, SELECTION METHOD, AND PROGRAM

(71) Applicant: Nippon Telegraph and Telephone Corporation, Tokyo (JP)

(72) Inventors: I Syu, Musashino (JP); Nobuhiro Kimura, Musashino (JP); Kotaro Mihara, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 165 days.

(21) Appl. No.: 17/628,379

(22) PCT Filed: Jul. 25, 2019

(86) PCT No.: PCT/JP2019/029158
§ 371 (c)(1),
(2) Date: Jan. 19, 2022

(87) PCT Pub. No.: WO2021/014631
PCT Pub. Date: Jan. 28, 2021

(65) Prior Publication Data
US 2022/0358140 A1    Nov. 10, 2022

(51) Int. Cl.
*G06F 16/00*    (2019.01)
*G06F 16/27*    (2019.01)
(52) U.S. Cl.
CPC .................. *G06F 16/273* (2019.01)
(58) Field of Classification Search
CPC ..................................... G06F 16/273

USPC ......................................... 707/613
See application file for complete search history.

(56) References Cited

U.S. PATENT DOCUMENTS 8,473,566 B1 *  6/2013  Cardente ............... G06F 3/0653
                                                             709/215

OTHER PUBLICATIONS

Kim et al., "SipCloud: Dynamically Scalable SIP Proxies in the Cloud," IPTcomm '11 Proceedings of the 5th International Conference on Principles, Systems and Applications of IP Telecommunications, Aug. 1, 2011, 6 pages.

* cited by examiner

*Primary Examiner* — Chelcie L Daye
(74) *Attorney, Agent, or Firm* — Fish & Richardson P.C.

(57) ABSTRACT

A selection device includes a storage unit and a selection unit. The storage unit stores the write time and the read time of each of a plurality of nodes. The selection unit selects a first response condition in response to a data write request on the basis of the write time of each of the plurality of nodes such that the response time for the data write request becomes shorter than a requirement value of the write time and the number of nodes in which writing has been completed increases. The selection unit selects a second response condition in response to a data read request on the basis of the first response condition and the read time of each of the plurality of nodes such that the response time for the data read request becomes shorter than a requirement value of the read time.

18 Claims, 12 Drawing Sheets

|  | Node 1a | Node 2a | Node 3a | Node 4a | Node 1b | Node 2b | Node 3b | Node 4b |
|---|---|---|---|---|---|---|---|---|
| Write latency | W1a | W2a | W3a | W4a | W1b | W2b | W3b | W4b |
| Read latency | R1a | R2a | R3a | R4a | R1b | R2b | R3b | R4b |

SELECTION APPARATUS, SELECTION METHOD, AND PROGRAM

CROSS-REFERENCE TO RELATED APPLICATIONS

This application is a National Stage application under 35 U.S.C. § 371 of International Application No. PCT/JP2019/029158, having an International Filing Date of Jul. 25, 2019. The disclosure of the prior application is considered part of the disclosure of this application, and is incorporated in its entirety into this application.

TECHNICAL FIELD

The present invention relates to a selection device, a selection method, and a program.

BACKGROUND ART

Along with the spread of virtual environment, virtualization of a server device, having been constructed on a dedicated hardware conventionally, is considered. For example, virtualization of a SIP server that performs call control in the IP telephone service is considered. A conventional SIP server is constructed on a dedicated hardware, and takes an active-standby configuration (ACT-SBY configuration) to improve reliability. Moreover, at a remote building located far from the active building where a SIP server is installed, when a SIP server having the same configuration is installed, the service can be continued in the case where the active building suffers from a disaster, so that the reliability can be further improved.

CITATION LIST

Patent Literature

Non-Patent Literature 1: J. Y. Kim et al., "SipCloud: Dynamically Scalable SIP Proxies in the Cloud," IPTcomm '11 Proceedings of the 5th International Conference on Principles, Systems and Applications of IP Telecommunications, Article No. 11, August 2011.

SUMMARY OF THE INVENTION

Technical Problem

For virtualization of a SIP server, an N-ACT configuration in which a plurality of call processing applications are operated on a virtual environment is considered. In the N-ACT configuration, it is possible to flexibly adjust the number of applications to be operated, whereby efficient resource utilization is expected.

When a SIP server is virtualized, in each of the call processing applications, session information required for call processing may be stored in a distributed database. In a conventional SIP server constructed on dedicated hardware, session information is stored in the internal memory of the dedicated hardware. In the case of adding a call processing application, when the new call processing application accesses the distributed database, existing session information can be acquired. Further, data redundancy can be realized by using the data replication function of the distributed database.

In the SIP call processing, when there is no response in a certain period of time, a time-out occurs, and retransmission or abnormal call occurs.

When a SIP server is virtualized and a distributed database is used, it is expected that the write time and the read time for session information become longer than those in a conventional SIP server. In the distributed database, if a response is made after waiting for completion of replication of the entire data, the real-time property may not be secured although the reliability is enhanced. In order to secure real-time property, if a response is made without waiting for completion of replication, the reliability is lowered. Not only the case of a SIP server, in the case where data of an application requiring real-time property is made redundant and stored in a distributed database, the same problem arises.

In view of the above, an object of the present invention is to secure real-time property and enhance reliability when using a database in which data is stored in a redundant manner.

Means for Solving the Problem

A selection device that is one aspect of the present invention is a selection device that selects a response condition of a database system in which data is duplicated and stored in a plurality of nodes. The selection device includes a storage unit that stores the write time and the read time of each of the plurality of nodes, and a selection unit. The selection unit selects a first response condition for sending back a response in response to a data write request on the basis of the write time of each of the plurality of nodes such that the response time for the data write request to the database system becomes shorter than a requirement value of the write time requested to the database system and the number of nodes in which writing has been completed increases, and selects a second response condition for sending back a response in response to a data read request on the basis of the first response condition and the read time of each of the plurality of nodes such that a response time for the data read request to the database system becomes shorter than a requirement value of the read time requested to the database system.

A selection method according to one aspect of the present invention is a selection method performed by a selection device that selects a response condition of a database system in which data is duplicated and stored in a plurality of nodes. The selection device holds the write time and the read time of each of the plurality of nodes. The method includes the steps of selecting a first response condition for sending back a response in response to a data write request on the basis of the write time of each of the plurality of nodes such that the response time for the data write request to the database system becomes shorter than a requirement value of the write time requested to the database system and the number of nodes in which writing has been completed increases; and selecting a second response condition for sending back a response in response to a data read request on the basis of the first response condition and the read time of each of the plurality of nodes such that the response time for the data read request to the database system becomes shorter than a requirement value of the read time requested to the database system.

Effects of the Invention

According to the present invention, it is possible to secure real-time property and enhance reliability when using a database in which data is stored in a redundant manner.

DESCRIPTION OF EMBODIMENTS

Hereinafter, embodiments of the present invention will be described with reference to the drawings.

Figure 1:
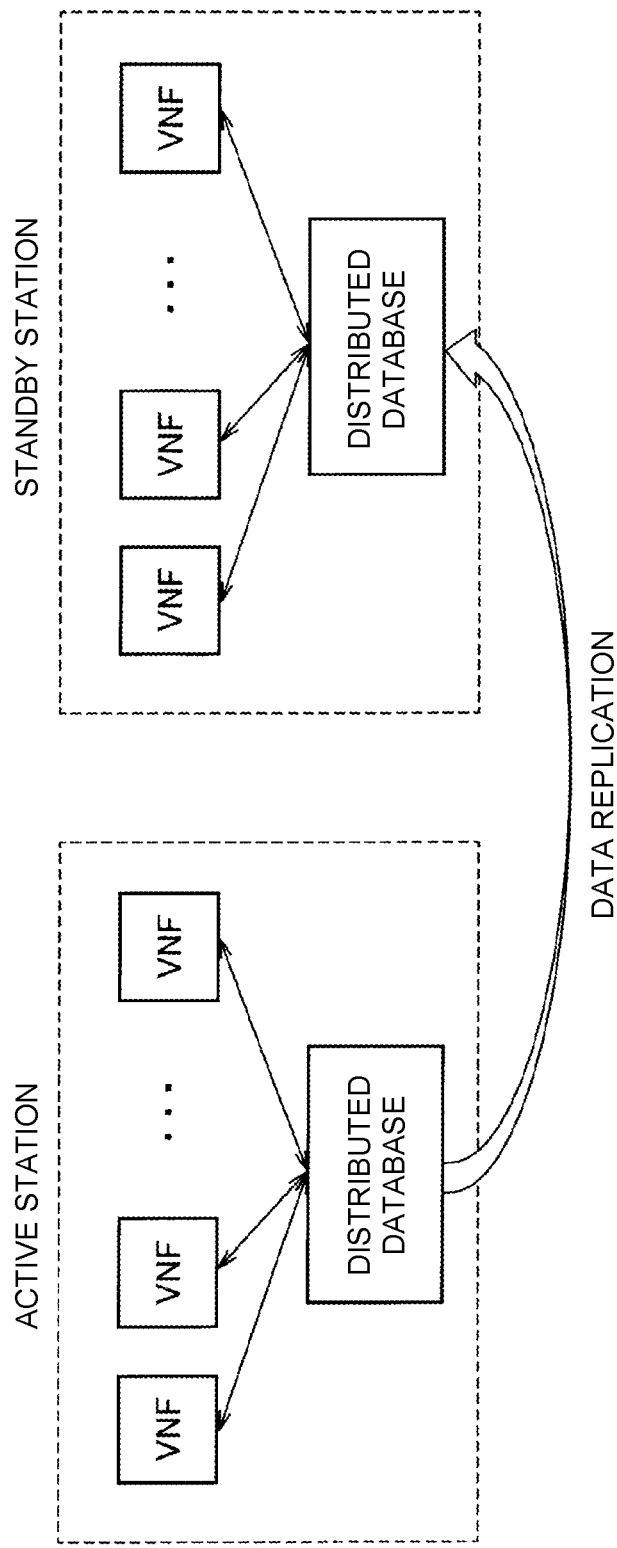
FIG. 1 is a diagram illustrating a state where a virtual network function uses a distributed database.

FIG. 1 is a diagram illustrating a state where a SIP server is virtualized and a call processing application is mounted as a virtual network function (VNF). In the drawing, a plurality of call processing applications operate as VNFs. During call processing, each of the VNFs reads and writes session information from/to the distributed database.

The distributed database uses a data replication function, and makes the session information redundant in the active station. Also, in a standby station located at a place far from the active station, a virtual environment and a distributed database that are the same as those of the active station may be installed to realize a duplex redundancy configuration. In that case, the session information of the active station is duplicated to the standby station.

As the distributed database, Cassandra may be used, for example. Cassandra is a database system having high scalability in which a plurality of nodes constitute a cluster to form a distributed database. In the Cassandra, data can be duplicated and stored distributively to the nodes, data replication can be made between different data centers.

Figure 2:
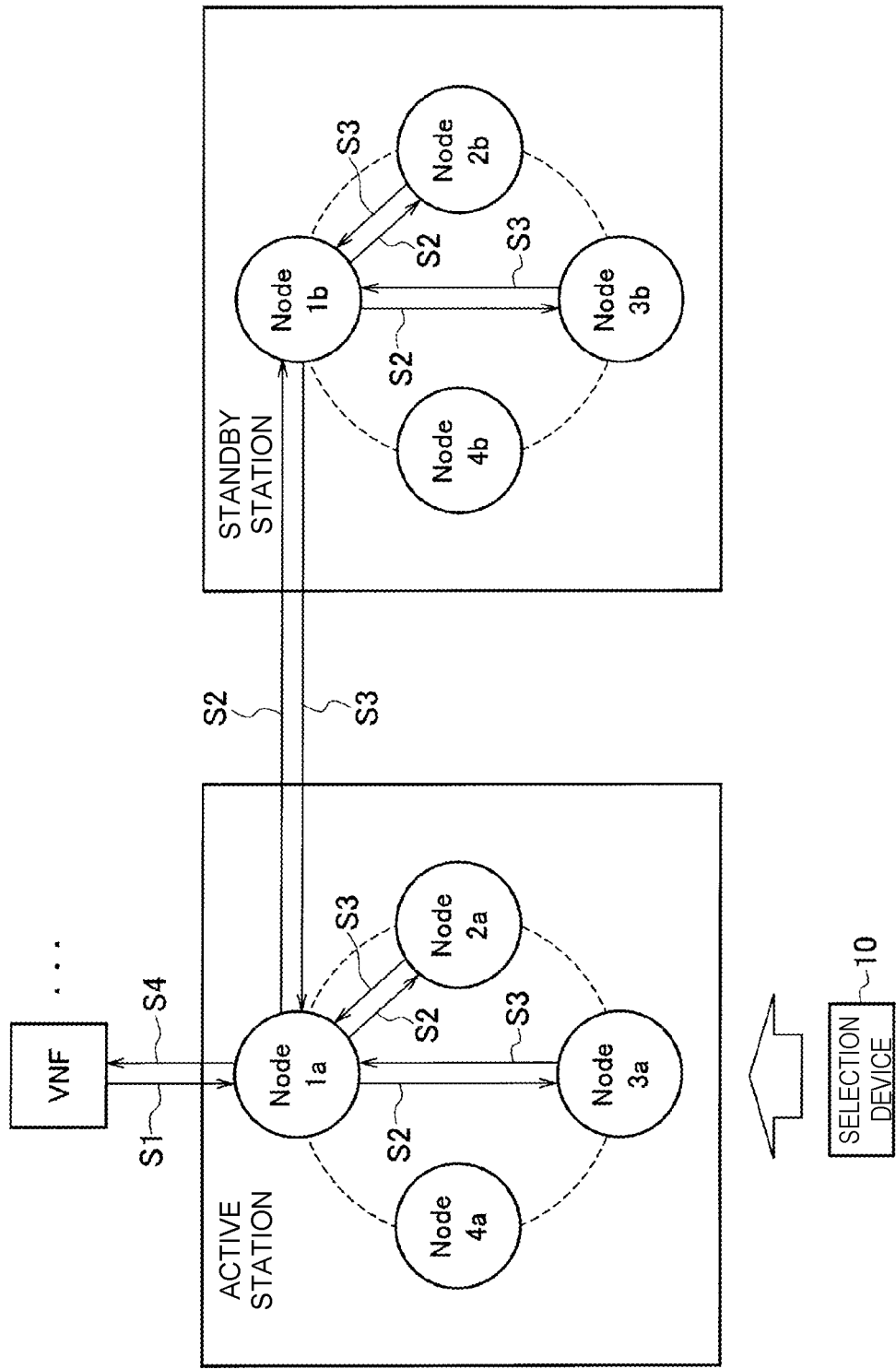
FIG. 2 is a diagram explaining read and write performed on a distributed database.

With reference to FIG. 2, write of data to a distributed database and read of data from a distributed database will be described.

FIG. 2 illustrates nodes 1a to 4a constituting an active distributed database, nodes 1b to 4b constituting a distributed database of a standby station, VNF that is a client of the distributed database, and a selection device 10 that selects a condition for sending back a response by the distributed database. Note that while four nodes constitute a distributed database in FIG. 2, the number of nodes is not limited to this. Hereinafter, description will be given on the assumption that the nodes 1a and 1b are coordinator nodes and the nodes 2a, 3a, 2b, and 3b are nodes in which data is stored. A coordinator node is a node that receives a request from a VNF. A coordinator node receives a request from a VNF, and replicates data to a node or acquires data from a node. Any node may function as a coordinator node, and any node may store data therein.

First, data write processing will be described.

At step S1, in the distributed database, a coordinator node 1a receives a data write request from a VNF.

At step S2, the coordinator node 1a replicates data to nodes of the same number as that of replication factor (RF) set in the distributed database, and also replicates the data to the coordinator node of the standby station. In FIG. 2, 2 is set to the RF of the distributed database of the active station, and it is also set to duplicate the data to the distributed database of the standby station. The coordinator node 1a replicates the data to the nodes 2a and 3a of the active station, and replicates the data to the coordinator node 1b of the standby station. In the standby station, the coordinator node 1b replicates the data to nodes of the same number as that of the RFs set in the distributed database of the standby station. To the RF of the distributed database of the standby station, 2 is also set. The coordinator node 1b replicates the data to the nodes 2b and 3b of the standby station. Note that RF is not limited to 2, but may be 3 or more.

At step S3, the coordinator node 1a receives a completion response from each of the nodes 2a and 3a. The coordinator node 1a also receives a completion response from the coordinator node 1b of the standby station. When the coordinator node 1b of the standby station receives a completion response from each of the nodes 2b and 3b, the coordinator node 1b sends back a completion response to the coordinator node 1a of the active station.

At step S4, the coordinator node 1a sends back a completion response that data is stored, to the VNF.

Next, data read processing will be described. Similar to the data write processing, in the data read processing, a coordinator node receives a request, acquires data from a node holding the data, and sends back the data to the VNF. The read processing is basically performed only from the distributed database of the active station.

When the coordinator node 1a receives a data read instruction from a VNF, the coordinator node 1a requests the nodes 2a and 3a holding the data for the data. In the present embodiment, no data is requested to the coordinator node 1b of the standby station. The coordinator node 1a may request the coordinator node 1b of the standby station for the data.

The coordinator node 1a receives the data from each of the nodes 2a and 3a, and transmits the data to the VNF. Note that when the time stamps of the pieces of data received from a plurality of nodes are different, the coordinator node 1a transmits data having the latest time stamp to the VNF.

Regarding the write processing, consideration will be given on four plans in which the timing of sending back a completion response by the coordinator node 1a differs from each other. Plan 1 is a plan in which the coordinator node 1*a* sends back a completion response at the timing when writing is completed in either the node 2*a* or 3*a* of the active station. Plan 2 is a plan in which the coordinator node 1*a* sends back a completion response at the timing when writing is completed in all of the nodes 2*a* and 3*a* of the active station. Plan 3 is a plan in which the coordinator node 1*a* sends back a completion response at the timing when writing is completed in all of the nodes 2*a* and 3*a* of the active station and writing is completed in either the node 2*b* or the node 3*b* of the standby station. Plan 4 is a plan in which the coordinator node 1*a* sends back a completion response at the timing when writing is completed in all of the nodes 2*a* and 3*a* of the active station and all of the nodes 2*b* and 3*b* of the standby station. In Plan 1, the consistency level is the lowest, but the real-time property is the highest. In Plan 2, the consistency level is higher than that of Plan 1, but the real-time property is lower than that of Plan 1. In Plan 3, the consistency level is higher than that of Plan 2, but the real-time property is lower than that of Plan 2. In Plan 4, the consistency level is the highest, but the real-time property is the lowest. As described above, the consistency level and the real-time property of the distributed database have a trade-off relationship.

Figure 3:
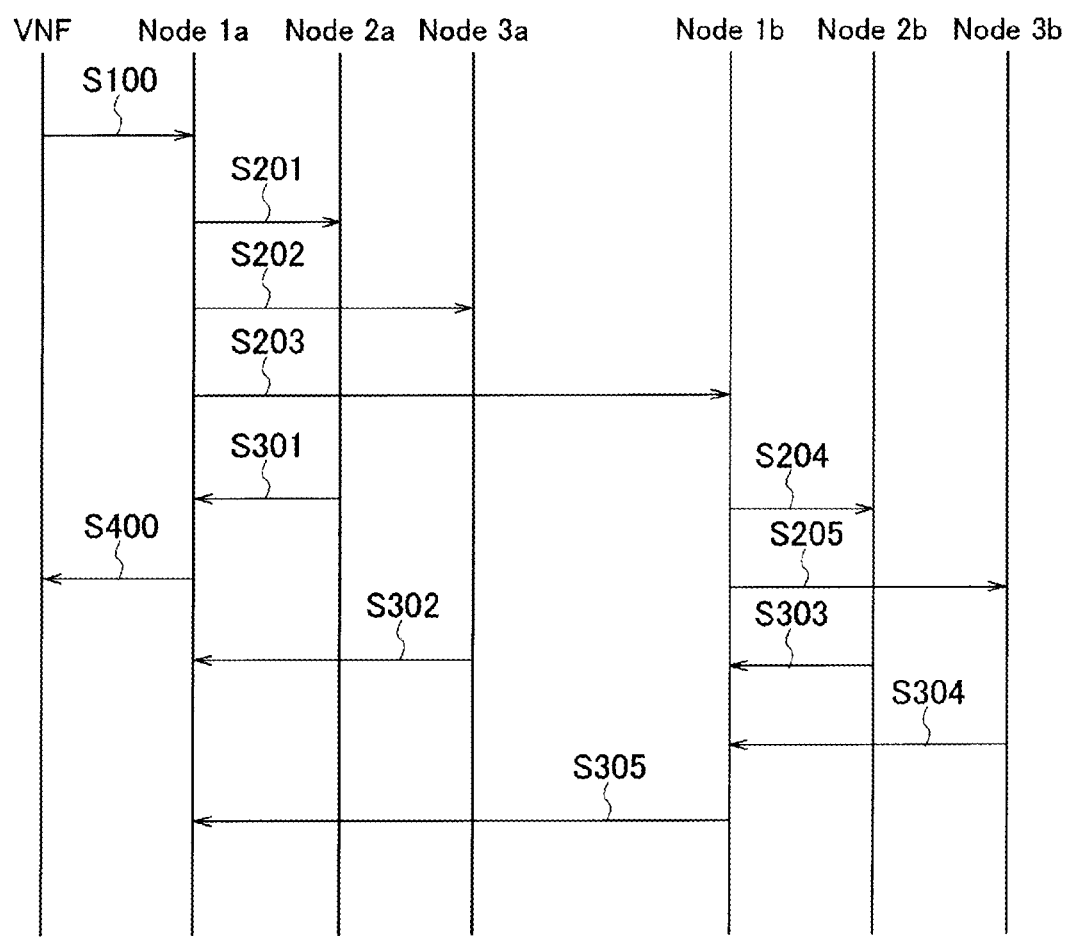
FIG. 3 is a sequence chart illustrating a flow of write processing of Plan 1.

With reference to FIG. 3, the flow of write processing of Plan 1 will be described.

At step S100, the coordinator node 1*a* receives a data write request from a VNF.

At steps S201 and S202, the coordinator node 1*a* replicates data to each of the node 2*a* and the node 3*a* of the active station.

At step S203, the coordinator node 1*a* replicates the data to the coordinator node 1*b* of the standby station.

At steps S204 and S205, the coordinator node 1*b* replicates the data to each of the node 2*b* and the node 3*b*.

At step S301, the coordinator node 1*a* receives a completion response from the node 2*a*.

At step S400, the coordinator node 1*a* sends back a completion response to the VNF, without waiting for a completion response from each of the node 3*a* and the coordinator node 1*b* of the standby station. Note that when a completion response from the node 3*a* at step S302 is earlier than a completion response from the node 2*a* at step S301, the coordinator node 1*a* sends back a completion response to the VNF without waiting for a completion response from the node 2*a*.

At step S302, the coordinator node 1*a* receives a completion response from the node 3*a*.

At steps S303 and S304, the coordinator node 1*b* receives a completion response from each of the node 2*b* and the node 3*b*.

At step S305, the coordinator node 1*a* receives a completion response from the node 1*b*.

In Plan 1, the coordinator node 1*a* sends back a completion response to the VNF upon receipt of a completion response from either the node 2*a* or the node 3*a*. Therefore, a minimum write time W1 in Plan 1 is either a time W2*a* that is the time until writing is completed in the node 2*a* or a time W3*a* that is the time until writing is completed in the node 3*a*, whichever is earlier. The minimum write time W1 in Plan 1 can be expressed by Expression (1) shown below. Note that in Expression (1), min represents a function which returns a minimum value of the data in the arguments.

$$W1=\min(W2a,W3a) \qquad (1)$$

Here, data read processing will be considered. Regarding the read processing, there are a plan in which the coordinator node 1*a* sends back data at the timing of receiving data from either the node 2*a* or the node 3*a*, and a plan in which the coordinator node 1*a* sends back data at the timing of receiving data from both the node 2*a* and the node 3*a*.

In Plan 1, when writing of data to the node 3*a* has failed, or when data is read from the node 3*a* before writing of data to the node 3*a* has been completed (between step S400 and step S302), wrong data will be returned. Accordingly, in the case of adopting Plan 1 for write processing, after receiving data from the node 2*a* and the node 3*a*, it is necessary to compare the time stamps of the two pieces of data, and send back the data having a new time stamp. That is, a minimum read time R1 corresponding to the write processing of Plan 1 is either a time R1*a* of reading the data from the node 2*a* or a time R3*a* of reading the data from the node 3*a*, whichever is later. The minimum read time R1 in Plan 1 can be expressed by Expression (2) shown below. Note that in Expression (2), max represents a function that returns a maximum value of the data in the arguments.

$$R1=\max(R2a,R3a) \qquad (2)$$

Figure 4:
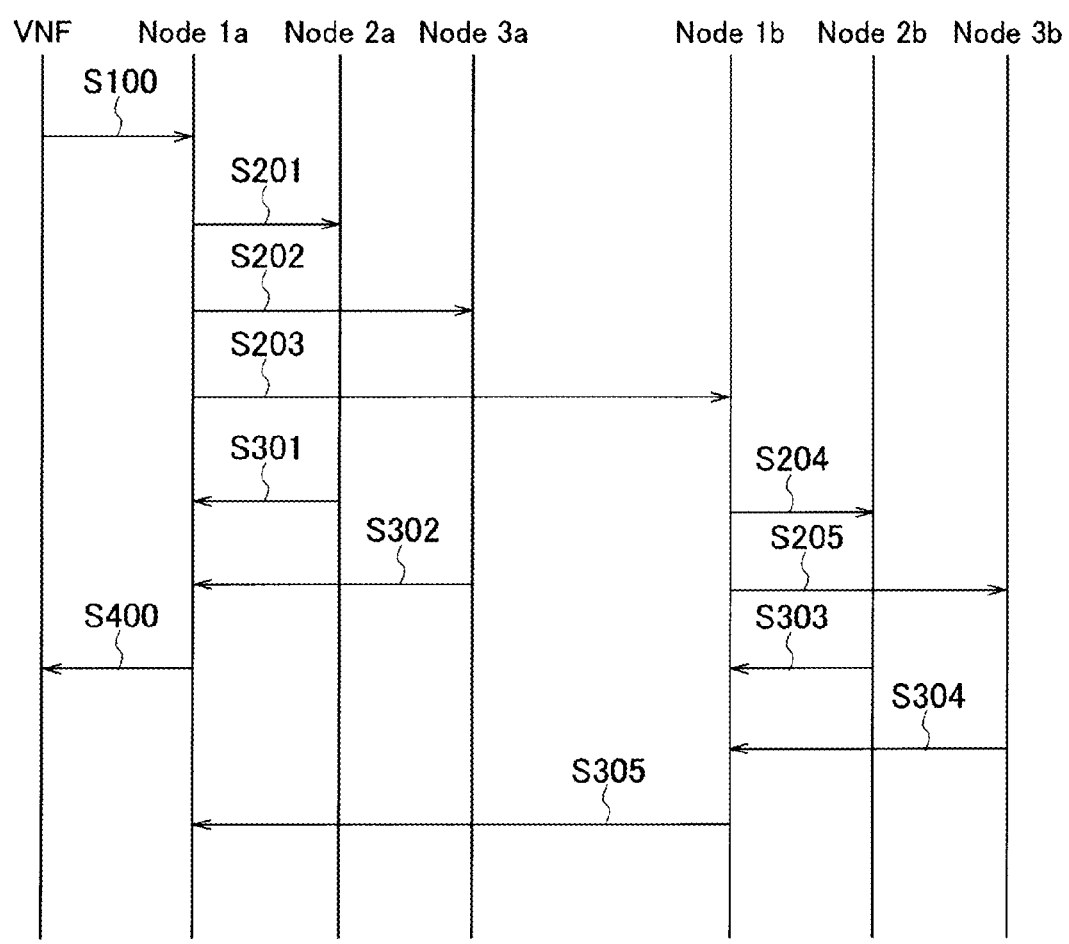
FIG. 4 is a sequence chart illustrating a flow of write processing of Plan 2.

With reference to FIG. 4, the flow of write processing of Plan 2 will be described.

At step S100, the coordinator node 1*a* receives a data write request from a VNF.

In steps S201 to S205, the coordinator nodes 1*a* and 1*b* store data in the nodes 2*a* and 3*a* of the active station and in the nodes 2*b* and 3*b* of the standby station.

At step S301, the coordinator node 1*a* receives a completion response from the node 2*a*.

At step S302, the coordinator node 1*a* receives a completion response from the node 3*a*.

At step S400, since the coordinator node 1*a* has received completion responses from both the node 2*a* and the node 3*a*, the coordinator node 1*a* sends back a completion response to the VNF.

In steps S303 to S305, the coordinator node 1*b* receives completion responses from the node 2*b* and the node 3*b*, and sends back a completion response to the coordinator node 1*a*.

In Plan 2, since the coordinator node 1*a* sends back a completion response to the VNF upon receipt of completion responses from both the node 2*a* and the node 3*a*, the minimum write time in Plan 2 is either the time W2*a* that is the time until writing is completed in the node 2*a* or the time W3*a* that is the time until writing is completed in the node 3*a*, whichever is later. The minimum write time W2 in Plan 2 is expressed by Expression (3) shown below.

$$W2=\max(W2a,W3a) \qquad (3)$$

In Plan 2, since writing has been completed in both the node 2*a* and the node 3*a*, it is possible to send back the data of either the node 2*a* or the node 3*a*. That is, the minimum read time R2 corresponding to the write processing of Plan 2 is either a time R2*a* of reading the data from the node 2*a* or a time R3*a* of reading the data from the node 3*a*, whichever is earlier. The minimum read time R2 in Plan 2 can be expressed by Expression (4) shown below.

$$R2=\min(R2a,R3a) \qquad (4)$$

Figure 5:
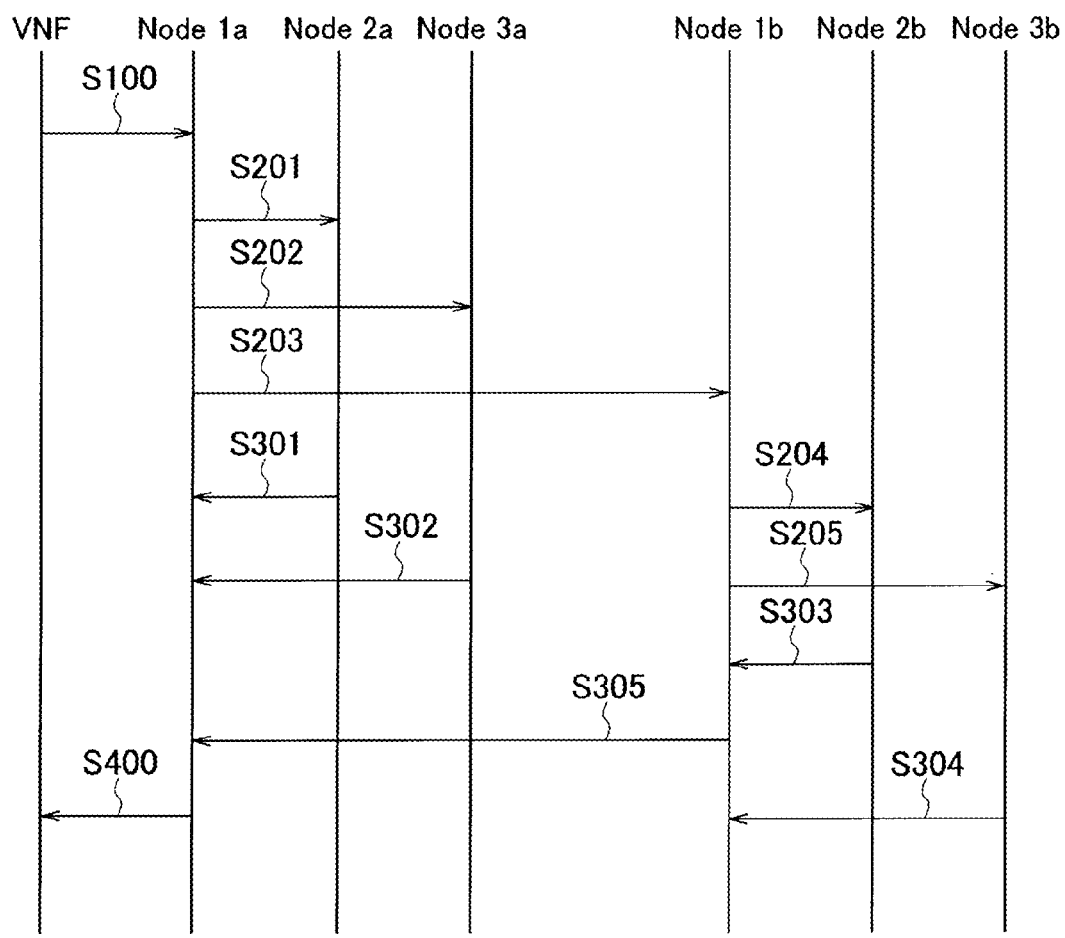
FIG. 5 is a sequence chart illustrating a flow of write processing of Plan 3.

With reference to FIG. 5, the flow of write processing of Plan 3 will be described.

At step S100, the coordinator node 1*a* receives a data write request from a VNF.

In steps S201 to S205, the coordinator nodes 1*a* and 1*b* store data in the nodes 2*a* and 3*a* of the active station and in the nodes 2*b* and 3*b* of the standby station.

At steps S301 and S302, the coordinator node 1a receives a completion response from each of the node 2a and the node 3a.

At step S303, the coordinator node 1b receives a completion response from the node 2b.

At step S305, the coordinator node 1b sends back a completion response to the coordinator node 1a without waiting for a completion response from the node 3b. Note that when a completion response from the node 3b is earlier than a completion response from the node 2b, the coordinator node 1b sends back a completion response to the coordinator node 1a without waiting for a completion response from the node 2b.

At step S400, since the coordinator node 1a has received completion responses from the node 2a, the node 3a, and the standby station, the coordinator node 1a sends back a completion response to the VNF.

At step S304, the coordinator node 1b receives a completion response from the node 3b.

In Plan 3, the coordinator node 1a sends back a completion response to the VNF when it receives completion responses from both the node 2a and the node 3a and receives a completion response from the coordinator node 1b. The coordinator node 1b sends back a completion response to the coordinator node 1a when the coordinator node 1b receives a completion response from either the node 2b or the node 3b. When the completion response from the standby station is later than the completion response from each node of the active station, the minimum write time W3 in Plan 3 is either a time W2b that is the time until writing is completed in the node 2b or a time W3b that is the time until writing is completed in the node 3b, whichever is earlier. When the completion response from the standby station is earlier than the completion response from a node of the active station, the minimum write time W3 in Plan 3 is either the time W2a that is the time until writing is completed in the node 2a or the time W3a that is the time until writing is completed in the node 3a, whichever is later. The minimum write time W3 in Plan 3 can be expressed by Expression (5) shown below.

$$W3=\max(\max(W2a,W3a),\min(W2b,W3b)) \quad (5)$$

In Plan 3, since writing has been completed in both the node 2a and the node 3a, the minimum read time R3 corresponding to the write processing in Plan 3 can be expressed by Expression (6) shown below as in the case of Plan 2.

$$R3=\min(R2a,R3a) \quad (6)$$

Figure 6:
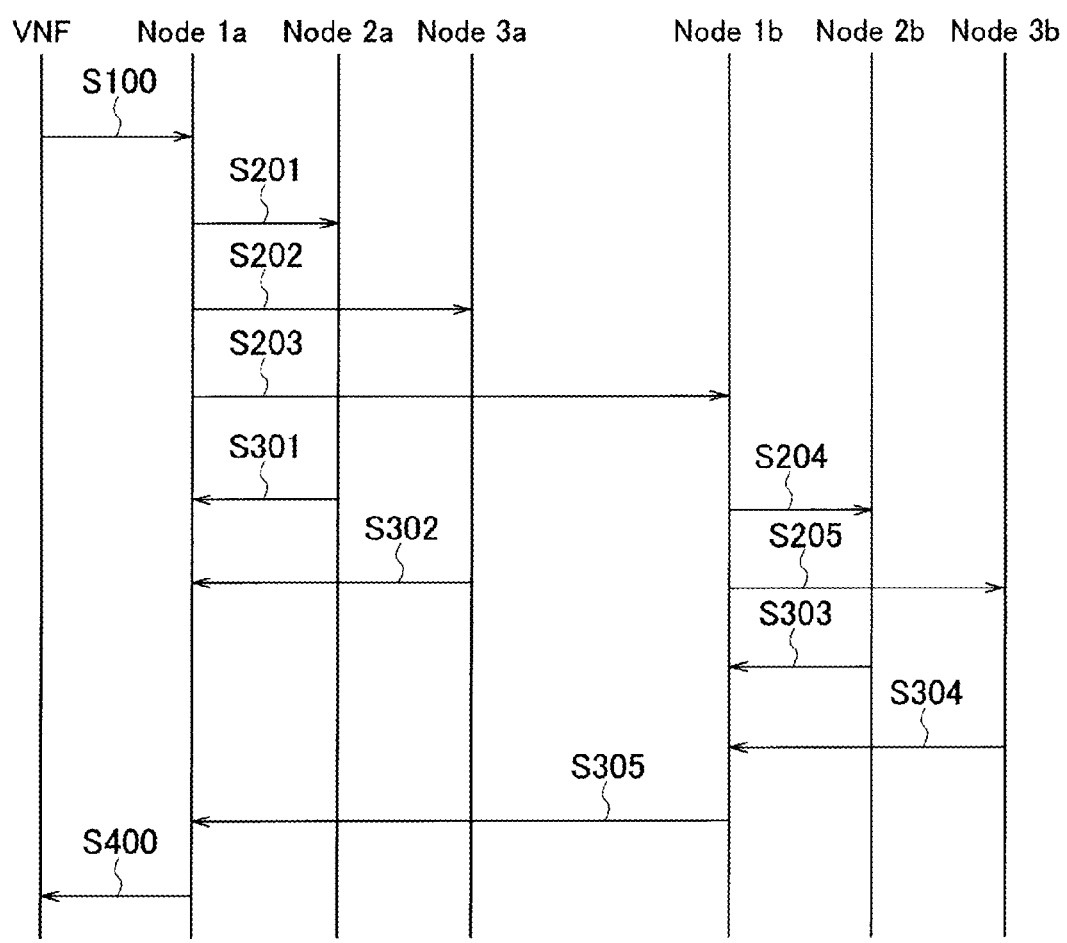
FIG. 6 is a sequence chart illustrating a flow of a write processing of Plan 4.

With reference to FIG. 6, the flow of write processing of Plan 4 will be described.

At step S100, the coordinator node 1a receives a data write request from a VNF.

In steps S201 to S205, the coordinator nodes 1a and 1b store data in the nodes 2a and 3a of the active station and in the nodes 2b and 3b of the standby station.

At steps S301 and S302, the coordinator node 1a receives a completion response from each of the node 2a and the node 3a.

At steps S303 and S304, the coordinator node 1b receives a completion response from each of the node 2b and the node 3b.

At step S305, the coordinator node 1b sends back a completion response to the coordinator node 1a.

At step S400, since the coordinator node 1a has received completion responses from the node 2a, the node 3a, and the standby station, the coordinator node 1a sends back a completion response to the VNF.

In Plan 4, the coordinator node 1a sends back a completion response to the VNF when it receives completion responses from both the node 2a and the node 3a and receives a completion response from the coordinator node 1b. The coordinator node 1b sends back a completion response to the coordinator node 1a when it receives completion responses from both the node 2b and the node 3b. This means that in Plan 4, the coordinator node 1a sends back a completion response to the VNF when receiving completion responses from all of the nodes 2a, 3a, 2b, and 3b in which data is stored. The minimum write time W4 in Plan 4 can be expressed by Expression (7) shown below.

$$W4=\max(W2a,W3a,W2b,W3b) \quad (7)$$

In Plan 4, since writing has been completed in both the node 2a and the node 3a, the minimum read time R4 corresponding to the write processing in Plan 4 can be expressed by Expression (8) shown below as in the case of Plan 2.

$$R4=\min(R2a,R3a) \quad (8)$$

The selection device 10 of the present embodiment considers the minimum write times W1 to W4 and the minimum read times R1 to R4 of Plans 1 to 4 described above, and selects response conditions for the write processing and the read processing of the distributed database so as to enhance reliability within the range where the VNF secures the real-time property.

Figure 7:
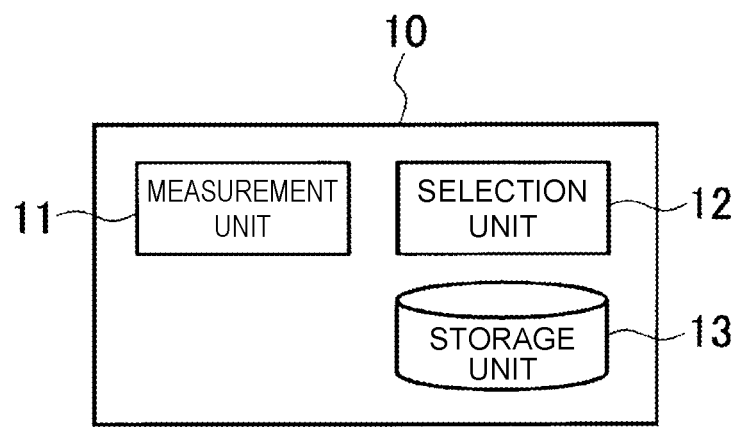
FIG. 7 is a function block diagram illustrating an exemplary configuration of a selection device.

With reference to FIG. 7, the configuration of the selection device 10 will be described. The selection device 10 illustrated therein includes a measurement unit 11, a selection unit 12, and a storage unit 13.

The measurement unit 11 measures the write time and the read time of each of the nodes 1a to 4a of the active station and the nodes 1b to 4b of the standby station.

The selection unit 12 selects a response condition for sending back a response by the distributed database so as to enhance the reliability on the basis of the write time and the read time of each node measured by the measurement unit 11, so as to satisfy the requirement of the VNF.

The storage unit 13 has a table in which the write time and the read time of each node, measured by the measurement unit 11, are recorded. In the case where the write time and the read time are known without measurement performed by the measurement unit 11, it is possible to have a table thereof.

Figure 8:
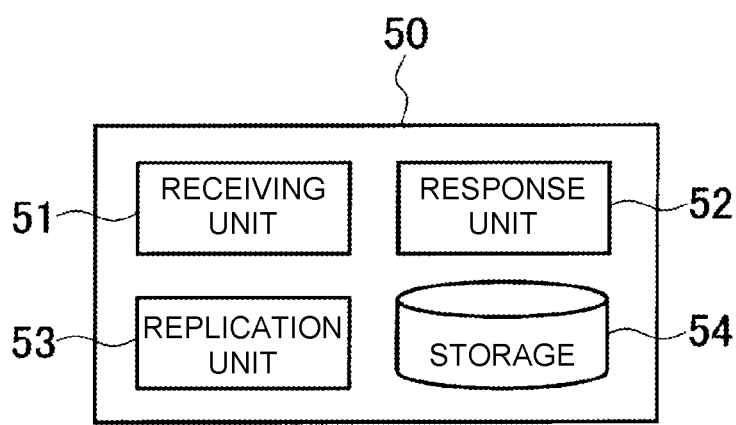
FIG. 8 is a function block diagram illustrating an exemplary configuration of a node.

With reference to FIG. 8, a configuration of a node of a distributed database will be described. A node 50 illustrated in the drawing includes a reception unit 51, a response unit 52, a replication unit 53, and a storage 54. It is preferable that the node 50 is mounted on the cloud in order to improve scalability.

The reception unit 51 receives data and stores it in the storage 54. The reception unit 51 receives a data read request. When the node 50 functions as a coordinator node, the reception unit 51 receives a completion response from another node 50 and receives data.

The response unit 52 sends back a completion response when data writing is completed. The response unit 52 reads data from the storage 54 and sends back the data, in response to a read request. When the node 50 functions as a coordinator node, the node 50 sends back a completion response and sends back data when a set condition is satisfied.

When the node 50 functions as a coordinator node, the replication unit 53 replicates data to another node and requests another node for data reading.

The storage 54 stores data therein.

Figure 9:
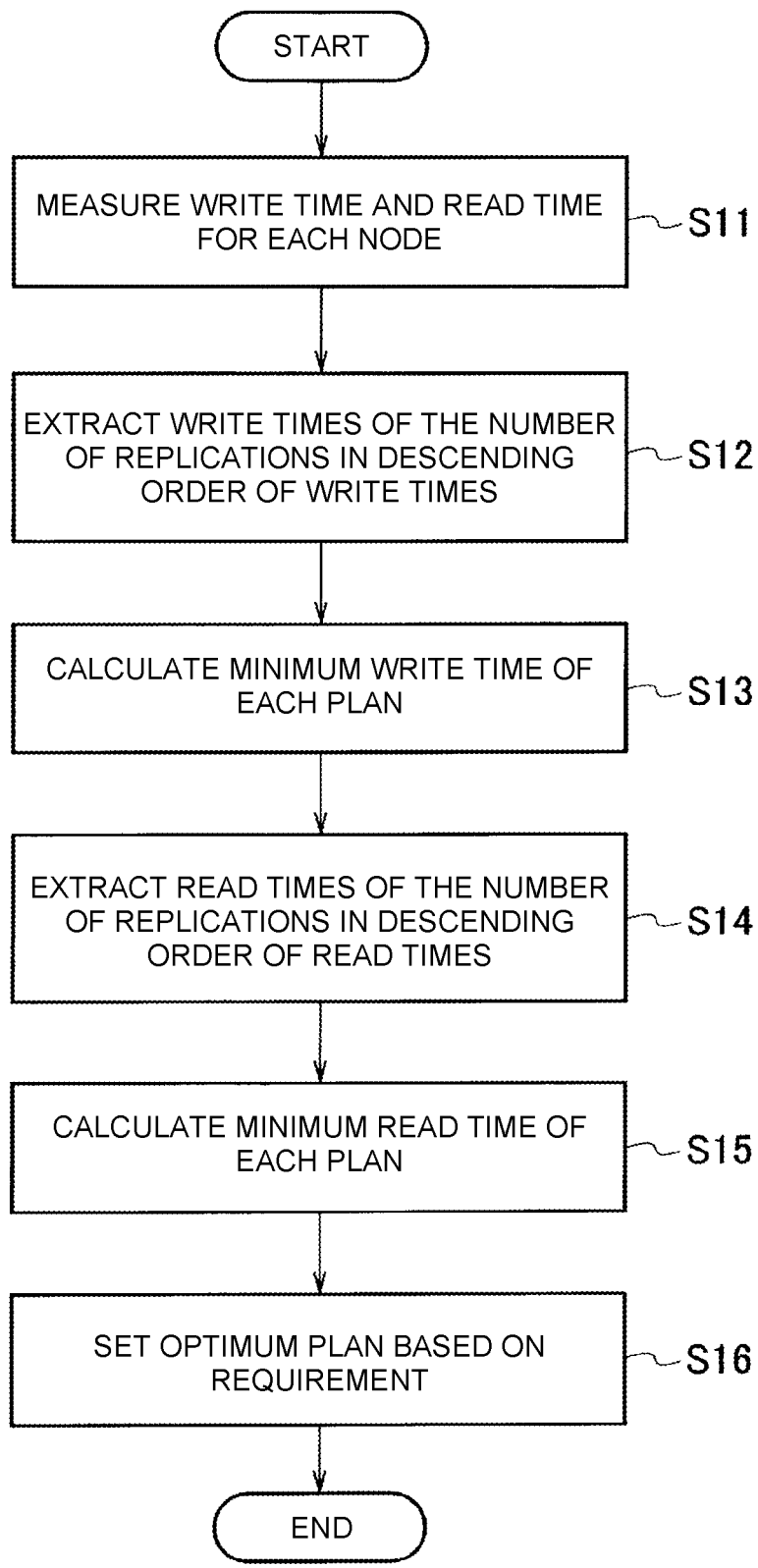
FIG. 9 is a flowchart illustrating a flow of processing by the selection device.

With reference to FIG. 9, the processing by the selection device 10 of the present embodiment will be described.

Figures 10, 11:
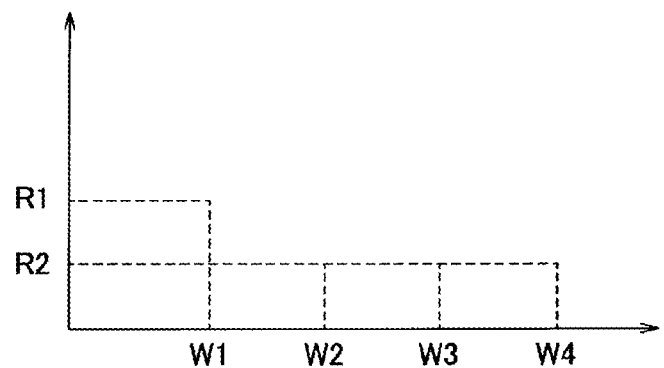
FIG. 10 illustrates an example of the read time and the write time for each node.
FIG. 11 is a diagram illustrating, on a plane, a minimum write time and a minimum read time of a distributed database.

At step S11, the measurement unit 11 performs data writing and data reading on each node, and measures the write time and the read time for each node. The measurement unit 11 may measure the write time and the read time a plurality of times, and use the average thereof as the write time and the read time. The measurement result by the measurement unit 11 is stored in the storage unit 13. In the case where the write time and the read time of each node are known, step S11 may not be performed. In FIG. 10, the upper row shows an example of the write time for each node and the lower row shows an example of the read time for each node.

At step S12, the selection unit 12 extracts the given number (the number of RFs) of write times in the descending order of the length of the write times from the table stored in the storage unit 13, for each of the active station and the standby station. For example, it is assumed that the number of RFs is two, and the length of the write times in the nodes 1a to 4a of the active station satisfies $W2a>W3a>W1a>W4a$ in the measurement result of FIG. 10. The selection unit 12 extracts W2a and W3a, according to the descending order of the length of the write times. Further, it is also assumed that the length of the write times in the nodes 1b to 4b of the standby station satisfies $W2b>W3b>W1b>W4b$. The selection unit 12 extracts W2b and W3b, according to the descending order of the length of the write times.

At step S13, the selection unit 12 calculates the minimum write time required for executing each plan. Specifically, the selection unit 12 calculates the minimum write times W1 to W4 by substituting the write times extracted at step S12 in Expression (1), Expression (3), Expression (5), and Expression (7).

At step S14, the selection unit 12 extracts the given number (the number of RFs) of read times in the descending order of the length of the read times from the table stored in the storage unit 13, for each of the active station and the standby station. For example, it is assumed that the number of RFs is two, and the length of the read times in the nodes 1a to 4a of the active station satisfies $R2a>R3a>R1a>R4a$ in the measurement result of FIG. 10. The selection unit 12 extracts R2a and R3a, according to the descending order of the length of the read times. Further, it is also assumed that the length of the read times in the nodes 1b to 4b of the standby station satisfies $R2b>R3b>R1b>R4b$. The selection unit 12 extracts R2b and R3b according to the descending order of the length of the read times.

At step S15, the selection unit 12 calculates the minimum read time required for executing each plan. Specifically, the selection unit 12 calculates the minimum read times R1 to R4 by substituting the write times extracted at step S12 in Expression (2), Expression (4), Expression (6), and Expression (8).

FIG. 11 is a diagram illustrating the minimum write times W1 to W4 and the minimum read times R1 and R2 on a plane. The horizontal axis shows the write time, and the vertical axis shows the read time. The time becomes longer as it goes rightward and upward. As it goes rightward, the reliability is higher but the real-time property is lower. As it goes upward, the real-time property is lower. In the present embodiment, since the minimum read times R3 and R4 of Plans 3 and 4 are the same as the minimum read time R2 of Plan 2, only the minimum read times R1 and R2 are shown.

At step S16, the selection unit 12 selects the optimum plan on the basis of the requirement of the VNF, and on the basis of the selected plan, sets response conditions for the write processing and the read processing of the distributed database. The response conditions selected for Plans 1 to 4 will be provided below.

In the case of Plan 1, as a response condition for sending back a completion response by the distributed database in response to a data write request, the selection unit 12 selects the case where a completion response has been made from any node of the active station to which data is replicated. As a response condition for sending back data by the distributed database in response to a data read request, the selection unit 12 selects the case where a completion response has been made from every node of the active station in which the data is stored.

In the case of Plan 2, as a response condition for sending back a completion response by the distributed database in response to a data write request, the selection unit 12 selects the case where a completion response has been made from every node of the active station to which the data is replicated. As a response condition for sending back data by the distributed database in response to a data read request, the selection unit 12 selects the case where a completion response has been made from any node of the active station in which the data is stored.

In the case of Plan 3, as a response condition for sending back a completion response by the distributed database in response to a data write request, the selection unit 12 selects the case where a completion response has been made from every node of the active station to which the data is replicated and from the distributed database of the standby station, and as a response condition for sending back a completion response by the distributed database of the standby station, the selection unit 12 selects the case where a completion response has been made from any node of the standby station to which the data is replicated. As a response condition for sending back data by the distributed database in response to a data read request, the selection unit 12 selects the case where data has been received from any node of the active station in which the data is stored.

In the case of Plan 4, as a response condition for sending back a completion response by the distributed database in response to a data write request, the selection unit 12 selects the case where a completion response has been made from every node of the active station to which the data is replicated and from the distributed database of the standby station, and as a response condition for sending back a completion response by the distributed database of the standby station, the selection unit 12 selects the case where a completion response has been made from every node of the standby station to which the data is replicated. As a response condition for sending back data by the distributed database in response to a data read request, the selection unit 12 selects the case where data has been received from any node of the active station in which the data is stored.

For the four cases illustrated in FIGS. 12 to 15, plans for selection by the selection unit 12 will be described. It is assumed that a requirement value for the write time of the VNF is W0, and a requirement value for the read time is R0. At the time of data writing, the distributed database must send back a response earlier than the requirement value W0 of the write time. At the time of data reading, the distributed database must send back data earlier than the requirement value R0 of the read time.

Figure 12:
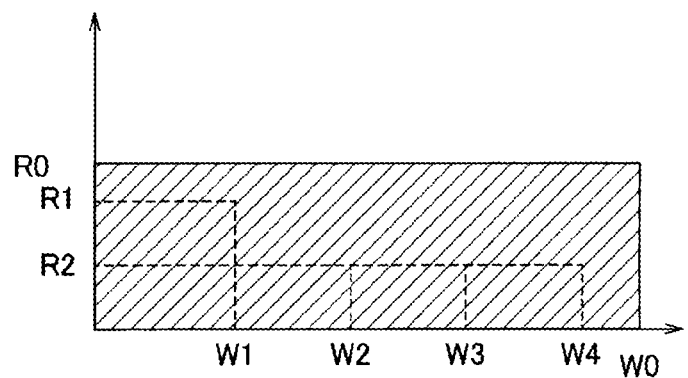
FIG. 12 is a diagram for explaining a case where Plan 4 can be selected.

In Case 1 of FIG. 12, the requirement value W0 of the write time is longer than the minimum write time W4 of Plan 4, and the requirement value R0 of the read time is longer than the minimum read time R2 of Plan 4. Therefore, the selection unit 12 selects Plan 4.

Figure 13:
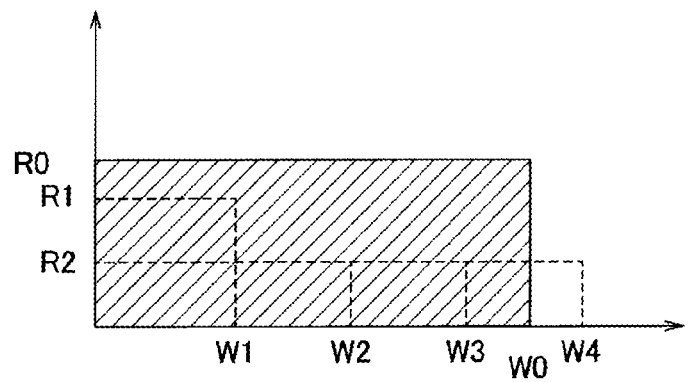
FIG. 13 is a diagram for explaining a case where Plan 3 can be selected.

In Case 2 of FIG. 13, the requirement value W0 of the write time is shorter than the minimum write time W4 of Plan 4 but is longer than the minimum write time W3 of Plan 3, and the requirement value R0 of the read time is longer than the minimum read time R2 of Plan 3. Therefore, the selection unit 12 selects Plan 3.

Figure 14:
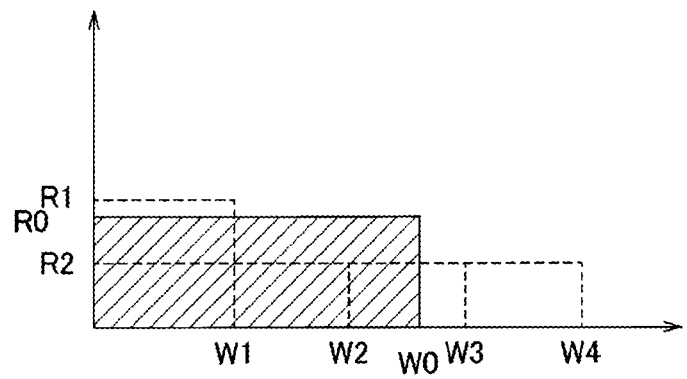
FIG. 14 is a diagram for explaining a case where Plan 2 can be selected.

In Case 3 of FIG. 14, the requirement value W0 of the write time is shorter than the minimum write time W3 of Plan 3 but is longer than the minimum write time W2 of Plan 2, and the requirement value R0 of the read time is longer than the minimum read time R2 of Plan 2. Therefore, the selection unit 12 selects Plan 2.

Figure 15:
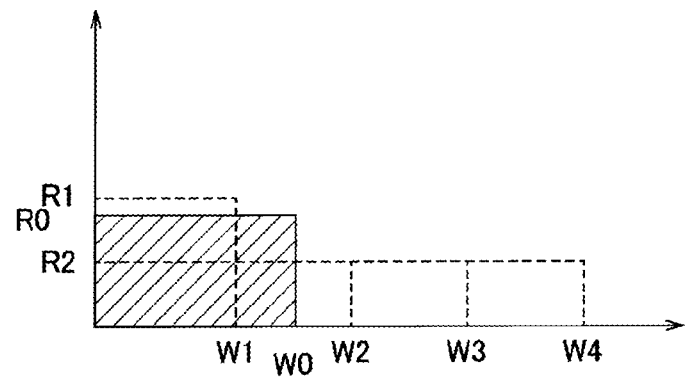
FIG. 15 is a diagram for explaining a case where any of the plans cannot be selected.

In Case 4 of FIG. 15, the requirement value W0 of write time is shorter than the minimum write time W2 of Plan 2, but is longer than the minimum write time W1 of Plan 1. However, since the requirement value R0 of the read time is shorter than the minimum read time R1 of Plan 1, the selection unit 12 cannot select either plan. In that case, it is necessary to consider mitigating the requirement, adopting another distributed database system, or the like.

As described above, the selection device 10 of the present embodiment includes the selection unit 12 and the storage unit 13. The storage unit 13 stores the write time and the read time of each of the plurality of nodes. The selection unit 12 selects a response condition for sending back a completion response in response to a data write request on the basis of the write time of each of the plurality of nodes such that the response time for the data write request to the distributed database becomes shorter than the requirement value W0 of the write time required for the distributed database and the number of nodes in which writing has been completed increases. The selection unit 12 selects a response condition for sending back data in response to a data read request on the basis of the response condition for data writing and the read time of each of the plurality of nodes such that the response time for a data read request to the distributed database becomes shorter than the requirement value R0 of the read time required for the distributed database. Thereby, in the use of the distributed database, it is possible to secure the real-time property and to enhance the reliability.

Figure 16:
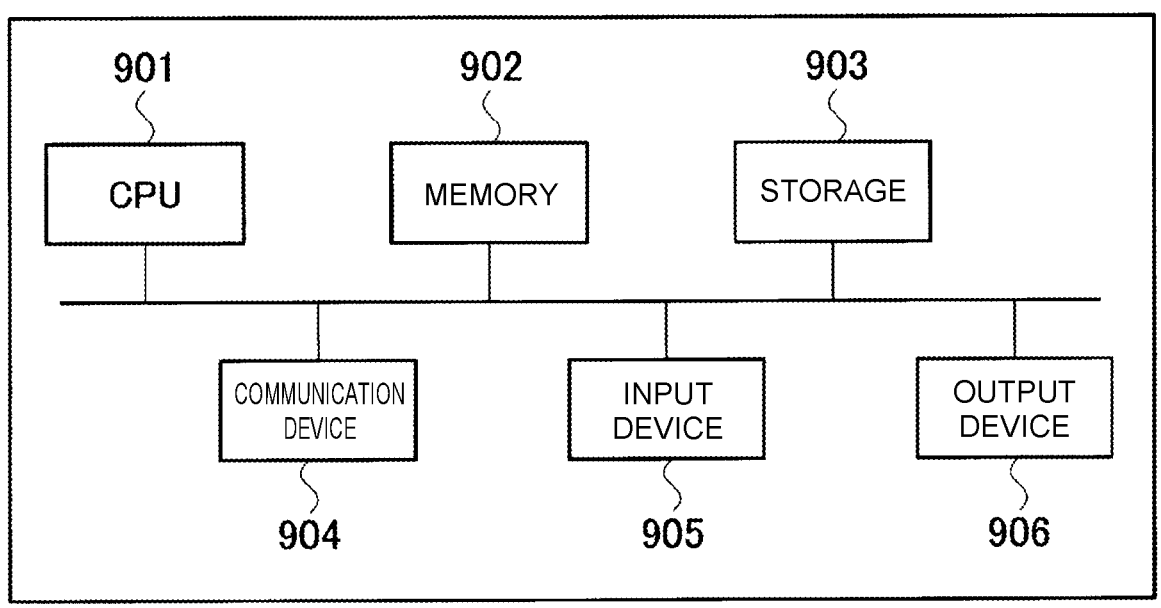
FIG. 16 is a diagram illustrating an example of a hardware configuration of a selection device.

As the selection device 10 described above, for example, a general-purpose computer system including a central processing unit (CPU) 901, a memory 902, a storage 903, a communication device 904, an input device 905, and an output device 906, as illustrated in FIG. 16, can be used. In the computer system, the CPU 901 executes a given program loaded on the memory 902 whereby the selection device 10 is realized. The program may be stored on a computer-readable storage medium such as a magnetic disk, an optical disk, and a semiconductor memory, or may be distributed through a network. The selection device 10 may be mounted on the cloud.

REFERENCE SIGNS LIST

10 Selection device
11 Measurement unit
12 Selection unit
13 Storage unit
50 Node
51 Reception unit
52 Response unit
53 Replication unit
54 Storage

The invention claimed is:

1. A selection device that selects a response condition of a database system in which data is duplicated and stored in a plurality of nodes, the selection device comprising:
a storage medium configured to store a write time and a read time of each of the plurality of nodes; and
a selection unit, including one or more processors, configured to:
select a first response condition for sending back a completion response in response to a data write request on a basis of the write time of each of the plurality of nodes such that a response time for the data write request to the database system becomes shorter than a requirement value of the write time requested to the database system and a number of nodes in which writing has been completed increases,
select a second response condition for sending back data in response to a data read request on a basis of the first response condition and the read time of each of the plurality of nodes such that a response time for the data read request to the database system becomes shorter than a requirement value of the read time requested to the database system,
instruct the database system to send back a completion response in response to a data write request according to the first response condition, and
instruct the database system to send back data in response to a data read request according to the second response condition.

2. The selection device according to claim 1, wherein the selection unit is configured to extract a given number of write times in descending order of length of the write times of the plurality of nodes, and when the requirement value of the write time is longer than a minimum write time among the extracted write times, the selection unit is configured to select a case in which a completion response has been made from any of the plurality of nodes as the first response condition, and select a case in which data has been received from all of the plurality of nodes as the second response condition.

3. The selection device according to claim 1, wherein when the requirement value of the write time is longer than a maximum write time among the write times of the plurality of nodes, the selection unit is configured to select a case in which completion responses have been made from all of the plurality of nodes as the first response condition, and select a case in which data has been received from any of the plurality of nodes as the second response condition.

4. The selection device according to claim 3, wherein the database system is configured to duplicate data to a second database system at another site,
the storage medium is configured to store a write time and a read time of each of a plurality of nodes of the second database system, and
the selection unit is configured to extract a given number of write times in descending order of length of the write times of the plurality of nodes of the second database system, and when a requirement value of the write time is longer than a minimum write time among the extracted write time, the selection unit is configured to select a case in which a completion response has been made from the second database system as the first response condition, and select a case in which data has been received from any of the plurality of nodes of the database system as the second response condition and, as a third response condition in which the second database system sends back a completion response in response to the data write request, the selection unit is configured to select a case in which a completion response has been made from any of the plurality of nodes of the second database system.

5. The selection device according to claim 4, wherein when the requirement value of the write time is longer than a maximum write time among the write times of the plurality of nodes, the selection unit is configured to select a case in which completion responses have been made from all of the plurality of nodes of the second database system as the third response condition.

6. The selection device according to claim 1, further comprising
a measurement unit, including one or more processors, configured to measure the write time and the read time of each of the plurality of nodes.

7. A selection method performed by a selection device that selects a response condition of a database system in which data is duplicated and stored in a plurality of nodes, the selection device holding a write time and a read time of each of the plurality of nodes, the method comprising:
selecting a first response condition for sending back a completion response in response to a data write request on a basis of the write time of each of the plurality of nodes such that a response time for the data write request to the database system becomes shorter than a requirement value of the write time requested to the database system and a number of nodes in which writing has been completed increases;
selecting a second response condition for sending back a completion response in response to a data read request on a basis of the first response condition and the read time of each of the plurality of nodes such that a response time for the data read request to the database system becomes shorter than a requirement value of the read time requested to the database system;
instruct the database system to send back a completion response in response to a data write request according to the first response condition; and
instruct the database system to send back data in response to a data read request according to the second response condition.

8. A non-transitory computer readable medium storing one or more instructions that cause a computer to operate as a selection device, that selects a response condition of a database system in which data is duplicated and stored in a plurality of nodes, and holds a write time and a read time of each of the plurality of nodes, to execute:
selecting a first response condition for sending back a completion response in response to a data write request on a basis of the write time of each of the plurality of nodes such that a response time for the data write request to the database system becomes shorter than a requirement value of the write time requested to the database system and a number of nodes in which writing has been completed increases;
selecting a second response condition for sending back a completion response in response to a data read request on a basis of the first response condition and the read time of each of the plurality of nodes such that a response time for the data read request to the database system becomes shorter than a requirement value of the read time requested to the database system;
instruct the database system to send back a completion response in response to a data write request according to the first response condition; and
instruct the database system to send back data in response to a data read request according to the second response condition.

9. The selection method according to claim 7, comprising:
extracting a given number of write times in descending order of length of the write times of the plurality of nodes; and
when the requirement value of the write time is longer than a minimum write time among the extracted write times, selecting a case in which a completion response has been made from any of the plurality of nodes as the first response condition, and selecting a case in which data has been received from all of the plurality of nodes as the second response condition.

10. The selection method according to claim 7, comprising:
when the requirement value of the write time is longer than a maximum write time among the write times of the plurality of nodes, selecting a case in which completion responses have been made from all of the plurality of nodes as the first response condition, and selecting a case in which data has been received from any of the plurality of nodes as the second response condition.

11. The selection method according to claim 10, wherein:
the database system duplicates data to a second database system at another site,
the selection device holds a write time and a read time of each of a plurality of nodes of the second database system, and
the selection method comprises:
extracting a given number of write times in descending order of length of the write times of the plurality of nodes of the second database system; and
when a requirement value of the write time is longer than a minimum write time among the extracted write time, selecting a case in which a completion response has been made from the second database system as the first response condition, and selecting a case in which data has been received from any of the plurality of nodes of the database system as the second response condition and, as a third response condition in which the second database system sends back a completion response in response to the data write request, selecting a case in which a completion response has been made from any of the plurality of nodes of the second database system.

12. The selection method according to claim 11, comprising:
when the requirement value of the write time is longer than a maximum write time among the write times of the plurality of nodes, selecting a case in which completion responses have been made from all of the plurality of nodes of the second database system as the third response condition.

13. The selection method according to claim 7, comprising:
measuring the write time and the read time of each of the plurality of nodes.

14. The non-transitory computer readable medium according to claim 8, wherein the one or more instructions cause the computer to execute:
extracting a given number of write times in descending order of length of the write times of the plurality of nodes; and when the requirement value of the write time is longer than a minimum write time among the extracted write times, selecting a case in which a completion response has been made from any of the plurality of nodes as the first response condition, and selecting a case in which data has been received from all of the plurality of nodes as the second response condition.

15. The non-transitory computer readable medium according to claim 8, wherein the one or more instructions cause the computer to execute:

when the requirement value of the write time is longer than a maximum write time among the write times of the plurality of nodes, selecting a case in which completion responses have been made from all of the plurality of nodes as the first response condition, and selecting a case in which data has been received from any of the plurality of nodes as the second response condition.

16. The non-transitory computer readable medium according to claim 15, wherein:

the database system duplicates data to a second database system at another site, the selection device holds a write time and a read time of each of a plurality of nodes of the second database system, and the one or more instructions cause the computer to execute:

extracting a given number of write times in descending order of length of the write times of the plurality of nodes of the second database system; and when a requirement value of the write time is longer than a minimum write time among the extracted write time, selecting a case in which a completion response has been made from the second database system as the first response condition, and selecting a case in which data has been received from any of the plurality of nodes of the database system as the second response condition and, as a third response condition in which the second database system sends back a completion response in response to the data write request, selecting a case in which a completion response has been made from any of the plurality of nodes of the second database system.

17. The non-transitory computer readable medium according to claim 16, wherein the one or more instructions cause the computer to execute:

when the requirement value of the write time is longer than a maximum write time among the write times of the plurality of nodes, selecting a case in which completion responses have been made from all of the plurality of nodes of the second database system as the third response condition.

18. The non-transitory computer readable medium according to claim 8, wherein the one or more instructions cause the computer to execute:

measuring the write time and the read time of each of the plurality of nodes.

\* \* \* \* \*